Jan. 5, 1937.  H. V. TÖRNEBOHM  2,066,952

CHANGE SPEED GEAR

Filed May 20, 1935

H. V. Törnebohm
Inventor

By: Glascock Downing & Seebold
Attys.

Patented Jan. 5, 1937

2,066,952

UNITED STATES PATENT OFFICE 2,066,952

CHANGE SPEED GEAR

Hilding Valdemar Törnebohm, Gothenburg, Sweden, assignor to Thor Hjalmar Ahlgren, Gothenburg, Sweden Application May 20, 1935, Serial No. 22,449
In Sweden December 14, 1934

9 Claims. (Cl. 74—287)

The present invention relates to a change speed gear comprising epicyclic gearing. The object of the invention is to make it possible by simple and reliable means to shift the gear from one gear ratio to another and to obtain a compact and strong construction particularly adapted to be used in such cases, where the space is limited or where for other reasons it is desirable to reduce the dimensions of the gear such as for instance in driving means for velocipedes or the like.

The invention relates more particularly to such epicyclic gearings, which comprise an outer ring or the like having internal teeth, planet gear wheels meshing therewith and a central gear wheel meshing with said planet wheels and wherein either the said outer toothed ring or the said central gear wheel is stationary, while the other is rotatable. The invention is characterized by the fact that a planet wheel carrier is rigidly connected to a driving shaft and that a hollow driven shaft carrying a sprocket wheel or the like is rotatably arranged on said driving shaft, a coupling sleeve carrying either said central gear wheel or said outer toothed ring being axially displaceable but not rotatably arranged on said hollow driven shaft, said sleeve being arranged when displaced in the one direction to disengage either the central gear wheel or the outer toothed ring from the planet wheels and to thereinafter be coupled to a driving member, the driving shaft or the planet wheel carrier or parts connected thereto.

Figure 1:
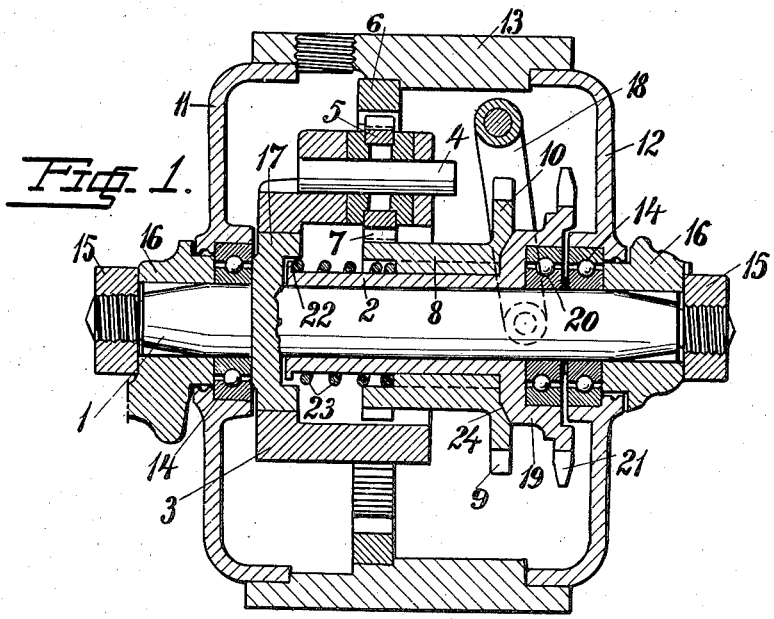
Figure 2:
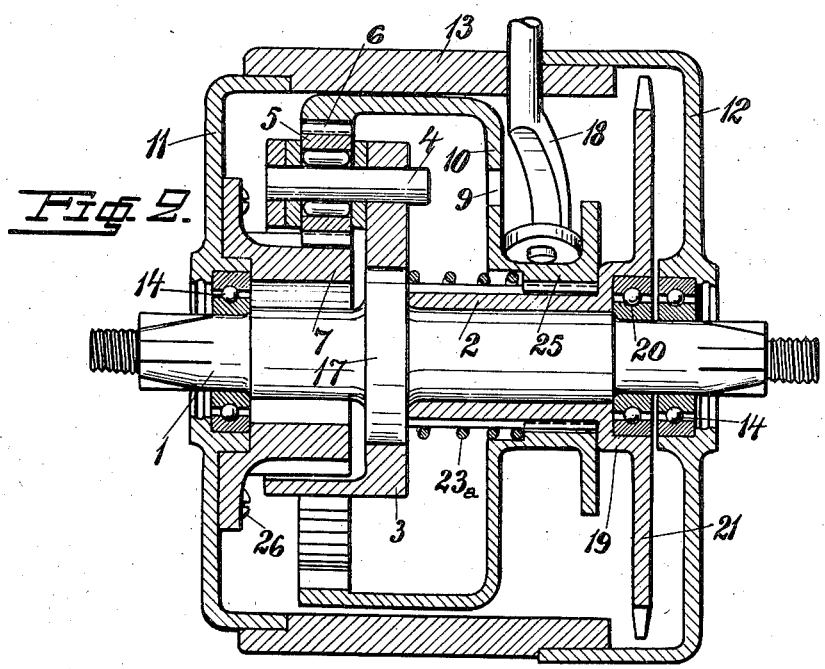

In the annexed drawing Figs. 1 and 2 show axial sections of two forms of embodiment of a change speed gear according to this invention.

In Fig. 1, 1 designates a driving shaft (the crank shaft of a velocipede) and 2 a driven sleeve-shaped shaft arranged on said driving shaft. The driving shaft 1 carries a yoke 3, in which there are arranged axles 4 for three planet gear wheels 5 (but one shown in the figure). The said planet wheels are in mesh with a ring 6 having internal teeth and also with a centrally arranged gear wheel 7 (the sun wheel), which latter is made integral with a coupling sleeve 8 axially displaceable on the driven shaft 2 and rotatable therewith by the aid of a key connection. The said sleeve is provided at its outer end with a flange 10 having a number of recesses 9 at its circumference. The number of recesses may for instance be six, and the pitch shall be equal to the half of the pitch of the axles 4 of the planet wheels 5, which axles have projecting ends and form coupling members adapted to engage the recesses 9 of the coupling flange 10, when the sleeve 8 is displaced in the direction from the right to the left in the figure.

All parts are enclosed in a stationary housing 13 having end shield bearing brackets 11, 12. The driven shaft 2 is, as mentioned, made in the form of a sleeve, through which passes the driving shaft 1 mounted in ball bearings 14 in the shields 11, 12. Secured to the ends of the latter shaft by means of nuts 15 are driving arms 16 (pedals). The toothed ring 6 is firmly secured to the housing 13, and the yoke 3 carrying the planet wheels 5 is made as a separate part and secured to a flange 17 formed on the shaft 1 for instance by means of a key. The displacement is effected by means of a forked arm 18 swingably mounted in the housing. The sleeve shaft 2 is provided with an enlarged portion 19, between which and the driving shaft 1 there is placed a ball bearing 20, and, besides, the said portion has a sprocket wheel 21, about which the driving chain leading to the rear wheel of the velocipede is to be placed in the ordinary manner. Placed between the coupling sleeve 8 and a flange 22 formed at the inner end of the sleeve shaft 2 is a compression spring 23 adapted, after the coupling sleeve 8 having been moved into engagement with the axle ends 4, to return the said sleeve with the sun wheel 7 into engagement with the planet wheels 5. The forked arm 18 may be actuated through a manoeuvering member arranged at the steering-rod of the velocipede or at any other suitable place. The coupling sleeve is provided with a conical recess 24 adapted to come into contact with a similarly shaped surface on the enlarged portion 19 of the sleeve shaft 2.

In the position of the gear wheels 5, 7 and the toothed ring 6 shown in the figure the planet wheel 5 will upon rotation of the shaft 1 in known manner roll in the stationary toothed ring 6 and at the same time by means of the sun wheel 7 and the sleeve 8 drive the shaft 2 at a speed, which is greater than that of the shaft 1. This position represents running at a gear ratio (changing up).

If the coupling sleeve 8 be displaced in the direction from the right towards the left, the sun wheel 7 will in the first hand be brought out of engagement with the planet wheels 5, and the shaft 1 will be free, whereby the planet wheels will but roll within the toothed ring 6, while the rotation of the shaft 2 ceases. This position represents free wheeling.

Upon further displacement of the sleeve 8 the ends of the axles 4 will be brought into engagement with the coupling flange 10 and thus with the shaft 2, which will hereby rotate at the same speed as does the driving shaft 1. This position represents direct drive.

The form of embodiment shown in Fig. 2 differs from that one according to Fig. 1 in this respect only that here the central gear wheel 7 is stationary, while the outer toothed ring 6 is arranged to rotate. The object is to obtain a lower gear ratio between the shafts 1 and 2 than at the embodiment according to Fig. 1, where the central gear wheel 7 is arranged to rotate, while the outer toothed ring 6 is stationary.

Corresponding details have the same reference numerals as in Fig. 1. The central gear wheel 7 is according to Fig. 2 secured to the one end shield 11 of the housing 13 by means of screws 26, and the driving shaft 1 passes freely through said gear wheels as well as through the hollow driven shaft 2, the portion 19 of which carrying the sprocket wheel 21 being mounted on the shaft 1 by means of the ball bearing 20. Axially displaceable on the shaft 2 by means of a forked arm 18 and guided on the shaft by the aid of a key connection is a sleeve 25 having formed integral therewith the flange 10 with the apertures 9 and the outer toothed ring 6. The axles 4 of the planet wheels 5 mounted in the yoke 3 are as before elongated and adapted to be brought into engagement with the apertures 9 in the flange 10 at the displacement of the toothed ring 6 out of engagement with the planet wheels 5.

Also in this case a compression spring 23a is provided between the sleeve 25 and a flange at the free end of the hollow shaft 2 similarly to the arrangement shown in Fig. 1 for automatically restoring the engagement between the toothed elements.

By the fact that according to the invention a changing up of the speed is effected at normal running the sprocket wheel 21 on the shaft 2 and the corresponding sprocket wheel on the rear shaft of the velocipede may, if desired, be made of equally great or substantially equally great diameters and preferably be made relatively small, so that the chain protection cover, if any, can be made light.

What I claim as new and desire to secure by Letters Patent of the United States of America is:—

1. A change speed gear comprising a driving shaft, a hollow driven shaft surrounding said driving shaft, a planet wheel carrier on said driving shaft, planet wheels in said carrier, an outer ring having internal teeth and a central gear wheel, both of said two latter toothed elements being in mesh with said planet wheels and one of them being stationary and the other rotatable, a sleeve axially displaceable but not rotatable on said hollow driven shaft, a coupling member and the said rotatable toothed element on said sleeve, coupling means in operative connection with said driving shaft, and means for axially displacing said sleeve for bringing said rotatable toothed element out of engagement with said planet wheels and for bringing said coupling member into engagement with said coupling means.

2. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a ring having internal teeth secured to said housing, planet wheels mounted in said carrier and meshing with said toothed ring, a sleeve axially displaceable but not rotatable on said hollow driven shaft, a coupling member and a central gear wheel on said sleeve, said gear wheel meshing with said planet wheels, coupling means on said planet wheel carrier, and means for axially displacing said sleeve for bringing said central gear wheel out of engagement with said planet wheels and for bringing said coupling member into engagement with said coupling means.

3. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a ring having internal teeth secured to said housing, planet wheels mounted in said carrier and meshing with said toothed ring, a sleeve axially displaceable but not rotatable on said hollow driven shaft, a coupling member and a central gear wheel on said sleeve, said gear wheel meshing with said planet wheels, coupling means on said planet wheel carrier, and means for axially displacing said sleeve for bringing said central gear wheel out of engagement with said planet wheels and for bringing said coupling member into engagement with said coupling means, said coupling means being formed by parts of the axles of said planet wheels.

4. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a central gear wheel secured to said housing, planet wheels mounted in said carrier and meshing with said central gear wheel, a sleeve axially displaceable but not rotatable on said hollow driven shaft, a coupling member and an outer ring having internal teeth on said sleeve, said toothed ring meshing with said planet wheels, coupling means on said planet wheel carrier, and means for axially displacing said sleeve for bringing said toothed ring out of engagement with said planet wheels and for bringing said coupling member into engagement with said coupling means.

5. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a central gear wheel secured to said housing, planet wheels mounted in said carrier and meshing with said central gear wheel, a sleeve axially displaceable but not rotatable on said hollow driven shaft, a coupling member and an outer ring having internal teeth on said sleeve, said toothed ring meshing with said planet wheels, coupling means on said planet wheel carrier, and means for axially displacing said sleeve for bringing said toothed ring out of engagement with said planet wheels and for bringing said coupling member into engagement with said coupling means, said coupling means being formed by parts of the axles of said planet wheels.

6. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a ring having internal teeth secured to said housing, planet wheels mounted in said carrier and meshing with said toothed ring, a sleeve axially displaceable but not rotatable on said hollow driven shaft, a coupling member and a central gear wheel on said sleeve, said gear wheel meshing with said planet wheels, coupling means on said planet wheel carrier, means for axially displacing said sleeve for bringing said central gear wheel out of engagement with said planet wheels and for bringing said coupling member into engagement with said coupling means, and means for automatically restoring the engagement between said toothed elements.

7. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a central gear wheel secured to said housing, planet wheels mounted in said carrier and meshing with said central gear wheel, a sleeve axially displaceable but not rotatable on said hollow driven shaft, a coupling member and an outer ring having internal teeth on said sleeve, said toothed ring meshing with said planet wheels, coupling means on said planet wheel carrier, means for axially displacing said sleeve for bringing said toothed ring out of engagement with said planet wheels and for bringing said coupling member into engagement with said coupling means, and means for automatically restoring the engagement between said toothed elements.

8. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a ring having internal teeth secured to said housing, planet wheels mounted in said carrier and meshing with said toothed ring, a sleeve axially displaceable but not rotatable on said hollow driven shaft, a coupling member and a central gear wheel on said sleeve, said gear wheel meshing with said planet wheels, coupling means on said planet wheel carrier, and means for axially displacing said sleeve for bringing said central gear wheel out of engagement with said planet wheels and for bringing said coupling member into engagement with said coupling means, there being provided for a free wheeling position between the gear drive position and the direct drive position.

9. In driving means for velocipedes, the combination of a housing, a driving shaft mounted in said housing and having a planet wheel carrier and driving arms secured thereto, a hollow driven shaft, a sprocket wheel on said latter shaft, the driving shaft passing through said hollow driven shaft, a central gear wheel secured to said housing, planet wheels mounted in said carrier and meshing with said central gear wheel, a sleeve axially displaceable but not rotatable on said hollow driven shaft, a coupling member and an outer ring having internal teeth on said sleeve, said toothed ring meshing with said planet wheels, coupling means on said planet wheel carrier, and means for axially displacing said sleeve for bringing said toothed ring out of engagement with said planet wheels and for bringing said coupling member into engagement with said coupling means, there being provided for a free wheeling position between the gear drive position and the direct drive position.

HILDING VALDEMAR TÖRNEBOHM.